Patented Aug. 5, 1947

2,425,094

UNITED STATES PATENT OFFICE 2,425,094

PROCESS FOR OBTAINING RUTIN FROM BUCKWHEAT

Edward L. Griffin, Jr., Philadelphia, Pa., assignor to United States of America, as represented by the Secretary of Agriculture No Drawing. Application July 31, 1946, Serial No. 687,504

4 Claims. (Cl. 260—333)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new process for obtaining rutin from buckwheat or other rutin-containing plants. Rutin is a drug of the flavinol group, which has recently been found to have therapeutic value, particularly in the reduction of capillary fragility.

One object of the new process is to be able to produce rutin at any season of the year from buckwheat which has been dried in such a manner as to conserve its rutin content and to permit storage without material deterioration.

One procedure for obtaining pure rutin from buckwheat entails harvesting the plant at a desirable degree of maturity and plunging it as promptly as possible into about 1.6 times its weight of denatured ethyl alcohol. By means of two alcoholic extractions the rutin is obtained, along with impurities, in an alcoholic solution which is then concentrated by evaporation. After standing to permit crystallization of the rutin it is filtered off along with tarry fats and resins and is then dried. The fats and resins are removed from the crude rutin by repeated extraction with benzol. The rutin is finally purified by repeated solution in hot water, filtration and crystallization from cold water.

This method requires the immediate processing of freshly harvested buckwheat, with high strength ethyl alcohol, which limits its application to the season when such material is available. I have discovered a new and useful process for producing pure rutin from buckwheat which eliminates these requirements.

In my process dried buckwheat serves as the raw material for preparing rutin. The freshly harvested buckwheat is rapidly dried under conditions such as to minimize the loss of rutin. A dried buckwheat meal can be prepared by drying and grinding the entire plant. A buckwheat "leaf meal" which is somewhat richer in rutin may be prepared by mechanically eliminating much of the stems which are low in rutin as follows:

The freshly harvested buckwheat is cut into lengths about three inches long with a fodder cutter, and then rapidly dried under conditions such as to minimize the loss of rutin and to dry to brittleness the leaves and blossoms, which contain most of the rutin, without completely drying the heavier stem portions of the plant, which contain less rutin. The high rutin bearing leaves and blossoms are then separated from the stems by breaking in a rotating perforated trommel. The desired fractions pass through the perforations while the worthless stems are discharged at the end of the trommel. A further elimination of stems is obtained by screening the leaf and blossom fractions. Both the buckwheat meal and the leaf meal described above can be stored for a year without significant loss in rutin content and can serve as raw material for my extraction process.

According to my process the dried buckwheat is extracted with dilute ethyl alcohol using a mixture of pure ethyl alcohol and water or denatured ethyl alcohol and water. For optimum extraction, alcohol concentration should be approximately 60%–70% ethanol by weight. Fair extraction is obtained with a concentration of ethanol as low as 50% or as high as 80%. Outside of these limits extraction continues to drop off and is relatively poor at 30% and 92.4% ethyl alcohol (95% by volume). Three successive eight-hour extractions may be given at room temperature using 6 or 7 parts of extractant per part of buckwheat, which will extract approximately 95% of the rutin. If desired, extraction may be carried out by the counter-current method commonly employed in such operations.

Where successive extraction is used, the process is not limited to three successive leaches at 6 or 7 parts of extractant to one part of buckwheat. Obviously, if a fewer number of leaches, or a lower ratio of extractant to buckwheat, is used the extraction of rutin will be decreased, and if more leaches or a higher ratio of extractant to solids is used the extraction of rutin will be increased. Nor is this extraction limited to eight hours duration. A longer or shorter period may be desirable depending on the amount of circulation, ratio of extractant to buckwheat, particle size of buckwheat or percent alcohol in extractant.

This method is not restricted to room temperature. Solubility of rutin increases with temperature and obviously extraction rate would be increased with increasing temperature. Particularly in countercurrent extraction, where solubility of rutin in the dilute alcohol may be a limiting factor, a temperature higher than room temperature may be desirable.

The combined extracts are evaporated down by simple pot distillation to concentrate the rutin and drive off and recover the alcohol. The alcohol so recovered is of sufficiently high concentration to be used as extractant without requiring rectification. Alcohol may be recovered from the spent meal by stripping it with open steam injected at the bottom of the extraction tank.

The rutin in the concentrated extract is allowed to crystallize, filtered off cold, dried and repeatedly extracted with benzol to remove the fats and resins. The rutin is finally purified by repeated solution in hot water, filtration and crystallization from cold water. If extreme purity of product is desired the rutin solution may be treated with silica gel during the final hot solution. If it is desired to remove the last traces of alcohol insolubles this may be done by dissolving the rutin after any crystallization in 92.4% or stronger alcohol (denatured or pure) filtering off the residue, evaporating off the alcohol, replacing it with water during evaporation and crystallizing as before.

The following is an example of how my process may be carried out using buckwheat leaf meal:

1200 pounds of fresh buckwheat plants, having a moisture content of about 85% and a rutin content of 2.5% (moisture-free basis) are dried at a temperature of 190° F. for a period of 40 minutes in a dryer providing rapid circulation of air through the bed of material. The product so obtained is separated into leaf meal and stems by breaking in a trommel having holes in the screen $\frac{3}{16}$" in diameter. The leaf meal fraction is further refined by means of a two-deck vibrating screen having a 3-mesh and a 60-mesh sieve. 100 pounds of leaf meal containing about 3% rutin are obtained from this screening operation. This meal is covered with 600 pounds of 65% alcohol (by weight) at room temperature (60-80° F.) with occasional circulation by means of an external pump. After eight hours as much extract as possible is drained off. These operations are repeated twice more. This will give a total volume of extracts of about 155 gallons which is then evaporated to remove and recover the alcohol, evaporation being stopped when vapor temperature reaches about 210° F. The cold aqueous concentrate is allowed to crystallize for 48 hours. The crude rutin, together with fatty matter, is then filtered off, dried, extracted with about 5 four-gallon batches of cold benzene, dried, and dissolved in about 75 pounds of 92.4% ethyl alcohol by weight (pure or denatured) which corresponds to 95% by volume. The alcohol solution is filtered and the alcohol driven off by evaporation and replaced with boiling water to make approximately 65 gallons of solution. This solution is treated with one pound of silica gel for about 5 minutes, filtered, cooled and allowed to crystallize 18 hours. The rutin is then filtered off, redissolved in about 65 gallons of boiling water, treated with one pound of silica gel for about five minutes, filtered hot, cooled and allowed to crystallize a third time for about 18 hours. The rutin is then filtered off and dried at a temperature not exceeding 130° C. The product is pure rutin suitable for pharmaceutical uses. All water used in the recrystallization steps must be at a pH below 7. If it is necessary to adjust the pH of the water, sulfuric acid may be used.

Although dried buckwheat has been used as a raw material for production of rutin in this disclosure, it is obvious that any other dried plant which contains rutin could be extracted in the same manner.

Pure ethyl alcohol was specified in this example but various denatured alcohols are equally satisfactory and may be substituted for pure alcohol. In this disclosure the term "ethyl alcohol" is taken to mean pure ethyl alcohol or a suitable denatured alcohol.

Having thus described my invention, I claim:

1. A process of preparing rutin from dried rutin-containing plants comprising extracting rutin therefrom by means of aqueous ethyl alcohol having a concentration of ethyl alcohol of about 35% to 85% by weight.

2. A process of preparing rutin from dried buckwheat plant comprising extracting rutin therefrom by means of aqueous ethyl alcohol having a concentration of ethyl alcohol between 35% and 85% by weight.

3. A process of preparing rutin from dried buckwheat plant comprising extracting rutin therefrom by means of aqueous ethyl alcohol having a concentration of ethyl alcohol of about 60% to 70% by weight.

4. The process of claim 3 in which the extraction is at about 60-80° F.

EDWARD L. GRIFFIN, JR.

REFERENCES CITED

The following references are of record in the file of this patent:

Weiss, Pharm. Centr., 1942, 903.
Schunck, J. Chem. Soc. 53, 262–267 (1888).